T. A. BEECHER.
KNIFE BLADE.
APPLICATION FILED AUG. 4, 1914.
1,135,987.
Patented Apr. 20, 1915.
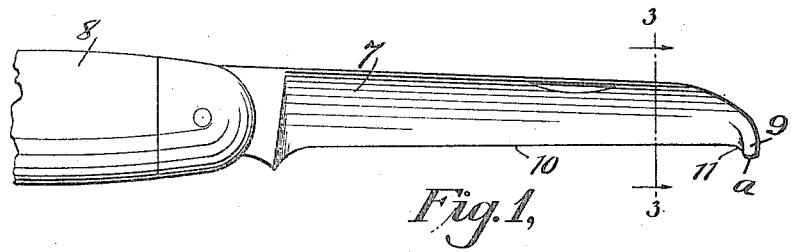
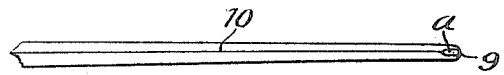
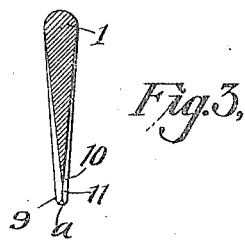
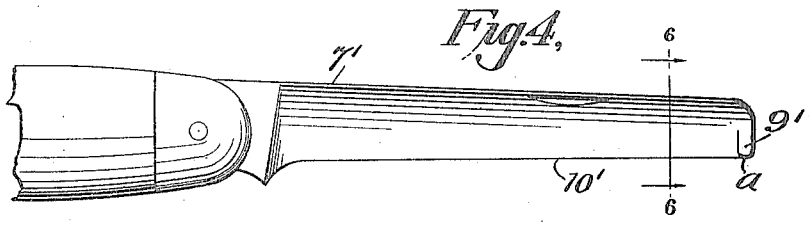
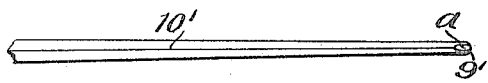
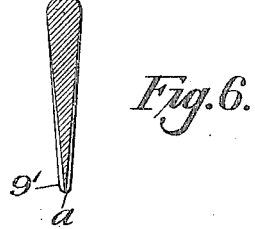
WITNESSES
Chas. H. Leibman
B. Joff
INVENTOR
Titus A. Beecher
BY Munn & Co
ATTORNEYS

UNITED STATES PATENT OFFICE.

TITUS ANDREW BEECHER, OF TAFT, CALIFORNIA.

KNIFE-BLADE.

1,135,987. Specification of Letters Patent. Patented Apr. 20, 1915.

Application filed August 4, 1914. Serial No. 854,921.

*To all whom it may concern:*

Be it known that I, TITUS A. BEECHER, a citizen of the United States, and a resident of Taft, in the county of Kern and State of California, have invented a new and Improved Knife-Blade, of which the following is a full, clear, and exact description.

My invention relates to knife blades to be used for nail cutting, and more particularly for trimming ingrowing toe nails.

The object of the invention is to provide a knife blade whereby in trimming the nails the knife will not cut the same to the quick, and which blade will easily and quickly trim the nails without any danger of injury to the flesh and thereby blood poisoning set in.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is an elevation of a blade embodying my invention; Fig. 2 is a plan view of the blade at the sharp edge; Fig. 3 is a vertical section on line 3—3, Fig. 1; Fig. 4 is a modified structure of a blade; Fig. 5 is a plan of the blade looking on the sharp edge; and Fig. 6 is a vertical section on line 6—6 of Fig. 4.

Referring to the drawings, 7 represents one of the blades of the jackknife 8. It is self-evident that if desired the blade 7 can be secured to a fixed handle, similar to a manicuring instrument. The blade 7 is provided at the unsecured end with a portion 9 projecting below the sharp edge 10 of the blade and which portion 9 forms the guide which protects the flesh when the nail is carved by the sharp edge, as will be seen from Fig. 2. Said projection 9 is dull and the portion 11 which joins the sharp edge 10 and the side portion 9 may be sharp or dull as desired, as shown in Figs. 1 to 3 the same is sharp.

Referring to Figs. 4 to 6 inclusive, the blade 7' in this case has its sharp edge 10' on a level with the portion 9' which forms the gear and prevents injury to the flesh when cutting the nails with the sharp edge 10'. In both forms the surface a of the portions 9 and 9' is dull and can be flat or rounded as may be desired. The said portion in each form may be used to draw or push out the cut-off parts of the nails that may be lodged under the nails.

The guard 9 may be used on surgical instruments or on knives used for butchering or slaughtering purposes, so as to prevent the cutting of delicate parts; and it is readily seen that a blade provided with a guard as described will protect the flesh while trimming the nail, thus preventing the cutting of the nail to the quick. It will be seen that when cutting with a blade as described, the guard formed by the portion 9 prevents the encroaching of the blade, generally due to the sharp point present on the blade, which sharp point in my case is substituted by the guard 9 which is dull, the inroad of the blade into the nail being prevented by the guard, causing the blade to slip out when reaching the end of the blade, thus preventing injury to the toe.

From the foregoing description, taken in connection with the accompanying drawings, the advantage of the construction of the device shown and method of operation thereof will be readily understood by those skilled in the art to which the invention pertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. In a knife blade a cutting edge and a guard at the non-secured end of the blade, said guard projecting beyond the cutting edge and in alinement therewith, said projecting portion of the guard being dull substantially as and for the purpose set forth.

2. A knife blade having a cutting edge terminating with a blunt portion at the free end of the blade, said blunt portion being in alinement with the sharp edge of the knife and forming a guard for said sharp edge, substantially as and for the purpose set forth.

In testimony whereof I have signed my name to this specification in the presence of two subscribing witnesses.

TITUS ANDREW BEECHER.

Witnesses:
Thos. W. Nash,
Anna Block.

Copies of this patent may be obtained for five cents each, by addressing the "Commissioner of Patents, Washington, D. C."